United States Patent
Zhong et al.

(10) Patent No.: US 12,203,353 B2
(45) Date of Patent: Jan. 21, 2025

(54) ELECTRICALLY-DRIVEN FRACTURING SYSTEM

(71) Applicant: YANTAI JEREH PETROLEUM EQUIPMENT & TECHNOLOGIES CO., LTD., Yantai (CN)

(72) Inventors: Jifeng Zhong, Yantai (CN); Jihua Wang, Yantai (CN); Liang Lv, Yantai (CN); Shouzhe Li, Yantai (CN); Yipeng Wu, Yantai (CN); Xincheng Li, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 17/774,795

(22) PCT Filed: Feb. 16, 2022

(86) PCT No.: PCT/CN2022/076452
§ 371 (c)(1),
(2) Date: May 5, 2022

(87) PCT Pub. No.: WO2023/155065
PCT Pub. Date: Aug. 24, 2023

(65) Prior Publication Data
US 2024/0159132 A1   May 16, 2024

(51) Int. Cl.
*E21B 43/26* (2006.01)
*F04B 17/03* (2006.01)
(Continued)

(52) U.S. Cl.
CPC .......... *E21B 43/2607* (2020.05); *F04B 17/03* (2013.01); *H02J 3/46* (2013.01); *H02J 7/35* (2013.01); *H02J 2300/24* (2020.01)

(58) Field of Classification Search
CPC ........ E21B 43/2607; F04B 17/03; H02J 3/46; H02J 7/35; H02J 2300/24
See application file for complete search history.

(56) References Cited

U.S. PATENT DOCUMENTS

| 1,711,979 A | 5/1929 | Helmut |
| 2,015,745 A | 10/1935 | Max |

(Continued)

FOREIGN PATENT DOCUMENTS

| CA | 2908276 A1 | 4/2016 |
| CN | 101636901 A | 1/2010 |

(Continued)

OTHER PUBLICATIONS

Non-Final Office Action for U.S. Appl. No. 17/242,316 mailed on May 26, 2022.
(Continued)

*Primary Examiner* — Carlos Amaya
(74) *Attorney, Agent, or Firm* — Sheppard Mullin Richter & Hampton LLP

(57) ABSTRACT

An electrically-driven fracturing system, which includes a main power generation device, a first auxiliary power generation device, a switch device, and an electrically-driven fracturing device; the electrically-driven fracturing device includes a fracturing motor and a fracturing auxiliary device; a rated generation power of the main power generation device is greater than that of the first auxiliary power generation device, a rated output voltage of the main power generation device is greater than that of the first auxiliary power generation device, the input end of the high-voltage switch group is connected to the main power generation device, the output end of the high-voltage switch group is connected to the fracturing motor, the input end of the low-voltage switch group is connected to the first auxiliary power generation device, and the output end of the low-
(Continued)

voltage switch group is connected to the fracturing auxiliary device.

20 Claims, 4 Drawing Sheets

(51) Int. Cl.
*H02J 3/46* (2006.01)
*H02J 7/35* (2006.01)

(56) References Cited

U.S. PATENT DOCUMENTS

| | | |
|---|---|---|
| 3,035,222 A | 5/1962 | Stone |
| 3,378,755 A | 4/1968 | Sawyer |
| 3,453,443 A | 7/1969 | Stoeckly |
| 3,794,377 A | 2/1974 | Wachsmuth et al. |
| 3,815,965 A | 6/1974 | Ostwald |
| 4,136,432 A | 1/1979 | Melley, Jr. |
| 4,201,523 A | 5/1980 | Olofsson |
| 4,336,485 A | 6/1982 | Stroud |
| 4,720,645 A | 1/1988 | Stroudxx |
| 4,793,775 A | 12/1988 | Peruzzi |
| 4,904,841 A | 2/1990 | English |
| 4,992,669 A | 2/1991 | Parmley |
| 5,274,322 A | 12/1993 | Hayashi et al. |
| 5,282,722 A | 2/1994 | Beatty |
| 5,517,822 A | 5/1996 | Haws et al. |
| 5,614,799 A | 3/1997 | Anderson et al. |
| 5,691,590 A | 11/1997 | Kawai et al. |
| 5,714,821 A | 2/1998 | Dittman |
| 5,751,150 A | 5/1998 | Rippel et al. |
| 5,821,660 A | 10/1998 | Anderson |
| 5,846,056 A | 12/1998 | Dhindsa et al. |
| 5,994,802 A | 11/1999 | Shichijyo et al. |
| 6,121,707 A | 9/2000 | Bell et al. |
| 6,134,878 A | 10/2000 | Amako et al. |
| 6,281,610 B1 | 8/2001 | Kliman et al. |
| 6,331,760 B1 | 12/2001 | Mclane, Jr. |
| 6,388,869 B1 | 5/2002 | Fauteux et al. |
| 6,417,592 B2 | 7/2002 | Nakamura et al. |
| 6,450,133 B1 | 9/2002 | Bernard et al. |
| 6,455,974 B1 | 9/2002 | Fogarty |
| 6,552,463 B2 | 4/2003 | Oohashi et al. |
| 6,704,993 B2 | 3/2004 | Fogarty |
| 6,765,304 B2 | 7/2004 | Baten et al. |
| 6,784,583 B2 | 8/2004 | Umeda |
| 6,786,051 B2 | 9/2004 | Kristich et al. |
| 6,893,487 B2 | 5/2005 | Alger et al. |
| 6,895,903 B2 | 5/2005 | Campion |
| 7,007,966 B2 | 3/2006 | Campion |
| 7,016,207 B2 | 3/2006 | Yamanaka et al. |
| 7,036,310 B2 | 5/2006 | Aoki et al. |
| 7,075,206 B1 | 7/2006 | Chen |
| 7,081,682 B2 | 7/2006 | Campion |
| 7,112,891 B2 | 9/2006 | Johnson et al. |
| 7,122,913 B2 | 10/2006 | Witten et al. |
| 7,221,061 B2 | 5/2007 | Alger et al. |
| 7,245,032 B2 | 7/2007 | Willets et al. |
| 7,291,954 B2 | 11/2007 | Kashihara et al. |
| 7,372,174 B2 | 5/2008 | Jones et al. |
| 7,511,385 B2 | 3/2009 | Jones et al. |
| 7,608,934 B1 | 10/2009 | Hunter |
| 7,615,877 B2 | 11/2009 | Willets et al. |
| 7,619,319 B1 | 11/2009 | Hunter |
| 7,635,926 B2 | 12/2009 | Willets et al. |
| 7,656,052 B2 | 2/2010 | Jones et al. |
| 7,667,342 B2 | 2/2010 | Matsumoto et al. |
| 7,692,321 B2 | 4/2010 | Jones et al. |
| 7,755,209 B2 | 7/2010 | Jones et al. |
| 7,921,914 B2 | 4/2011 | Bruins et al. |
| 8,159,082 B2 | 4/2012 | Gemin et al. |
| 8,294,285 B2 | 10/2012 | Hunter |
| 8,294,286 B2 | 10/2012 | Hunter |
| 8,362,638 B2 | 1/2013 | Gemin et al. |
| 8,495,869 B2 | 7/2013 | Beissler et al. |
| 8,519,591 B2 | 8/2013 | Nishimura |
| 8,587,136 B2 | 11/2013 | Williams |
| 8,670,260 B2 | 3/2014 | Wang et al. |
| 8,731,793 B2 | 5/2014 | Barbir et al. |
| 8,773,876 B2 | 7/2014 | Kuboyama et al. |
| 8,789,601 B2 | 7/2014 | Broussard et al. |
| 8,796,899 B2 | 8/2014 | Imazawa et al. |
| 8,811,048 B2 | 8/2014 | Zhang et al. |
| 9,103,193 B2 | 8/2015 | Coli et al. |
| 9,140,110 B2 | 9/2015 | Coli et al. |
| 9,166,495 B2 | 10/2015 | Guan |
| 9,209,704 B2 | 12/2015 | Huang |
| 9,534,473 B2 | 1/2017 | Morris et al. |
| 9,562,420 B2 | 2/2017 | Morris et al. |
| 9,577,545 B2 | 2/2017 | Tan et al. |
| 9,641,112 B2 | 5/2017 | Harknett et al. |
| 10,184,397 B2 | 1/2019 | Austin et al. |
| 10,411,635 B2 | 9/2019 | Takahashi |
| 10,523,130 B2 | 12/2019 | Bax et al. |
| 10,584,671 B2 | 3/2020 | Tunzini et al. |
| 10,648,311 B2 | 5/2020 | Oehring et al. |
| 10,855,142 B2 | 12/2020 | Cory |
| 10,865,624 B1 | 12/2020 | Cui et al. |
| 10,914,155 B2 | 2/2021 | Oehring et al. |
| 11,035,214 B2 | 6/2021 | Cui et al. |
| 11,109,508 B1 | 8/2021 | Yeung et al. |
| 11,125,066 B1 | 9/2021 | Yeung et al. |
| 11,208,878 B2 | 12/2021 | Oehring et al. |
| 11,220,895 B1 | 1/2022 | Yeung et al. |
| 11,378,008 B2 | 7/2022 | Yeung et al. |
| 11,391,136 B2 | 7/2022 | Coli et al. |
| 11,434,737 B2 | 9/2022 | Oehring et al. |
| 11,459,863 B2 | 10/2022 | Robinson et al. |
| 11,952,996 B2 * | 4/2024 | Oehring ............. E21B 43/2607 |
| 2003/0030246 A1 | 2/2003 | Campion |
| 2003/0033994 A1 | 2/2003 | Campion |
| 2003/0057704 A1 | 3/2003 | Baten et al. |
| 2003/0064858 A1 | 4/2003 | Saeki et al. |
| 2003/0079479 A1 | 5/2003 | Kristich et al. |
| 2004/0081561 A1 | 4/2004 | Iwanami et al. |
| 2004/0104577 A1 | 6/2004 | Alger et al. |
| 2004/0174723 A1 | 9/2004 | Yamanaka et al. |
| 2005/0093496 A1 | 5/2005 | Tokunou et al. |
| 2006/0066105 A1 | 3/2006 | Johnson et al. |
| 2006/0066108 A1 | 3/2006 | Willets et al. |
| 2006/0080971 A1 | 4/2006 | Smith et al. |
| 2006/0208594 A1 | 9/2006 | Kashihara et al. |
| 2006/0260331 A1 | 11/2006 | Andreychuk |
| 2007/0108771 A1 | 5/2007 | Jones et al. |
| 2007/0121354 A1 | 5/2007 | Jones et al. |
| 2007/0216452 A1 | 9/2007 | Matsumoto et al. |
| 2009/0146426 A1 | 6/2009 | Jones et al. |
| 2009/0146500 A1 | 6/2009 | Jones et al. |
| 2009/0147549 A1 | 6/2009 | Jones et al. |
| 2009/0308602 A1 | 12/2009 | Bruins et al. |
| 2010/0060076 A1 | 3/2010 | Gemin et al. |
| 2010/0084922 A1 | 4/2010 | Gollentz et al. |
| 2010/0135840 A1 | 6/2010 | Fujimoto et al. |
| 2011/0061411 A1 | 3/2011 | Kim et al. |
| 2012/0002454 A1 | 1/2012 | Kuboyama et al. |
| 2012/0065787 A1 | 3/2012 | Broniak et al. |
| 2012/0175947 A1 | 7/2012 | Gemin et al. |
| 2012/0248922 A1 | 10/2012 | Imazawa et al. |
| 2012/0255734 A1 | 10/2012 | Coli et al. |
| 2012/0292992 A1 | 11/2012 | Williams |
| 2013/0063070 A1 | 3/2013 | Zhang et al. |
| 2013/0182468 A1 | 7/2013 | Guan |
| 2013/0229836 A1 | 9/2013 | Wang et al. |
| 2013/0234522 A1 | 9/2013 | Tan et al. |
| 2013/0255153 A1 | 10/2013 | Sasaki et al. |
| 2014/0096974 A1 | 4/2014 | Coli et al. |
| 2014/0138079 A1 | 5/2014 | Broussard et al. |
| 2014/0174717 A1 | 6/2014 | Broussard et al. |
| 2014/0210213 A1 | 7/2014 | Campion et al. |
| 2014/0219824 A1 | 8/2014 | Burnette |
| 2014/0312823 A1 | 10/2014 | Huang |
| 2015/0027712 A1 | 1/2015 | Vicknair et al. |
| 2015/0068754 A1 | 3/2015 | Coli et al. |

(56) References Cited

U.S. PATENT DOCUMENTS

| | | |
|---|---|---|
| 2015/0252661 A1 | 9/2015 | Glass |
| 2015/0300145 A1 | 10/2015 | Coli et al. |
| 2015/0314255 A1 | 11/2015 | Coli et al. |
| 2016/0041066 A1 | 2/2016 | Patenaude et al. |
| 2016/0075387 A1 | 3/2016 | Fong et al. |
| 2016/0105022 A1 | 4/2016 | Oehring et al. |
| 2016/0177675 A1 | 6/2016 | Morris et al. |
| 2016/0177678 A1 | 6/2016 | Morris et al. |
| 2016/0369609 A1 | 12/2016 | Morris et al. |
| 2017/0104389 A1 | 4/2017 | Morris et al. |
| 2017/0154387 A1 | 6/2017 | Somers |
| 2017/0222409 A1 | 8/2017 | Oehring et al. |
| 2017/0285062 A1 | 10/2017 | Kim |
| 2017/0292789 A1 | 10/2017 | Hjorth et al. |
| 2017/0302135 A1 | 10/2017 | Cory |
| 2017/0305284 A1 | 10/2017 | Koh et al. |
| 2018/0059754 A1 | 3/2018 | Shaikh et al. |
| 2018/0080376 A1 | 3/2018 | Austin et al. |
| 2018/0080377 A1 | 3/2018 | Austin et al. |
| 2018/0156210 A1 | 6/2018 | Oehring et al. |
| 2018/0287386 A1 | 10/2018 | Oates et al. |
| 2018/0328157 A1 | 11/2018 | Bishop |
| 2019/0100989 A1 | 4/2019 | Stewart et al. |
| 2019/0128265 A1 | 5/2019 | Washio et al. |
| 2019/0157982 A1 | 5/2019 | Brueckner et al. |
| 2019/0169971 A1 | 6/2019 | Oehring et al. |
| 2019/0195292 A1 | 6/2019 | Pan et al. |
| 2019/0229643 A1 | 7/2019 | Bax et al. |
| 2019/0319459 A1 | 10/2019 | Brathwaite et al. |
| 2019/0331080 A1 | 10/2019 | Tunzini et al. |
| 2020/0040705 A1 | 2/2020 | Morris et al. |
| 2020/0040878 A1 | 2/2020 | Morris |
| 2020/0049136 A1 | 2/2020 | Stephenson |
| 2020/0109617 A1 | 4/2020 | Oehring et al. |
| 2020/0270948 A1 | 8/2020 | Kothuru et al. |
| 2020/0325760 A1 | 10/2020 | Markham |
| 2021/0040830 A1 | 2/2021 | Mu et al. |
| 2021/0040836 A1 | 2/2021 | Baskin |
| 2021/0095552 A1 | 4/2021 | Oehring et al. |
| 2021/0095648 A1 | 4/2021 | Buckley et al. |
| 2021/0102451 A1 | 4/2021 | Robinson et al. |
| 2021/0102530 A1 | 4/2021 | Pruitt et al. |
| 2021/0107616 A1 | 4/2021 | Pedersen |
| 2021/0199161 A1 | 7/2021 | Eto et al. |
| 2021/0301630 A1 | 9/2021 | Krippner et al. |
| 2021/0310341 A1 | 10/2021 | Sherman et al. |
| 2022/0018232 A1 | 1/2022 | Oehring et al. |
| 2022/0112892 A1 | 4/2022 | Cui et al. |
| 2022/0213777 A1 | 7/2022 | Cui et al. |
| 2022/0364448 A1 | 11/2022 | Oehring et al. |

FOREIGN PATENT DOCUMENTS

| | | | |
|---|---|---|---|
| CN | 101639040 | A | 2/2010 |
| CN | 101728860 | A | 6/2010 |
| CN | 201570910 | U | 9/2010 |
| CN | 102574475 | A | 7/2012 |
| CN | 102602322 | A | 7/2012 |
| CN | 102810909 | A | 12/2012 |
| CN | 103310963 | A | 9/2013 |
| CN | 103770852 | A | 5/2014 |
| CN | 104578389 | A | 4/2015 |
| CN | 204386465 | U | 6/2015 |
| CN | 105763337 | A | 7/2016 |
| CN | 106711990 | A | 5/2017 |
| CN | 107208557 | A | 9/2017 |
| CN | 107231000 | A | 10/2017 |
| CN | 107240915 | A | 10/2017 |
| CN | 207652040 | U | 7/2018 |
| CN | 108900136 | A | 11/2018 |
| CN | 109572449 | A | 4/2019 |
| CN | 110107490 | A | 8/2019 |
| CN | 110118127 | A | 8/2019 |
| CN | 110821464 | A | 2/2020 |
| CN | 210105993 | U | 2/2020 |
| CN | 210183018 | U | 3/2020 |
| CN | 111181159 | A | 5/2020 |
| CN | 210780534 | U | 6/2020 |
| CN | 111628519 | A | 9/2020 |
| CN | 111769551 | A | 10/2020 |
| CN | 212671744 | U | 3/2021 |
| CN | 213027453 | U | 4/2021 |
| CN | 112983382 | A | 6/2021 |
| CN | 112993965 | A | 6/2021 |
| CN | 113006757 | A | 6/2021 |

OTHER PUBLICATIONS

Search Report for Chinese Application No. 202110455679.3 mailed on May 28, 2022.
Written Opinion and International Search Report for PCT Application No. PCT/CN2021/132090 mailed on Jul. 7, 2022.
First Search for Chinese Application No. 201910510411.8 mailed on Oct. 10, 2023.
Wri ttten Opinion of the International Searching Authority and International Search Report for PCT Application No. PCT/CN2019/102811 mailed on Mar. 19, 2020.
International Preliminary Report on Patentability Chapter I for PCT Application No. PCT/CN2019/102811 mailed on Dec. 23, 2021.
Non-Final Office Action for U.S. Appl. No. 16/834,446 mailed on Jun. 5, 2020.
Non-Final Office Action for U.S. Appl. No. 16/834,446 mailed on Jan. 6, 2021.
Non-Final Office Action for U.S. Appl. No. 17/693,170 mailed on Aug. 29, 2023.
Written Opinion and International Search Report for PCT Application No. PCT/CN2022/076452 mailed on Jun. 1, 2022.
First Search for Chinese Application No. 202280000733.8 mailed on Mar. 14, 2023.
Non-Final Office Action for U.S. Appl. No. 18/360,678 mailed on Feb. 28, 2024.
Non-Final Office Action for U.S. Appl. No. 17/728,667 mailed on Sep. 16, 2022.
Non-Final Office Action for U.S. Appl. No. 17/733,922 mailed on Sep. 21, 2022.
Non-Final Office Action for U.S. Appl. No. 17/884,358 mailed on Dec. 8, 2022.
Final Office Action for U.S. Appl. No. 17/733,922 mailed on Dec. 28, 2022.
International Preliminary Report on Patentability Chapter I for PCT Application No. PCT/CN2022/076452 mailed on Aug. 29, 2024.
Notice of Allowance for U.S. Appl. No. 18/360,678 mailed on Aug. 20, 2024.
Notice of Allowance for U.S. Appl. No. 17/774,795 mailed on Sep. 20, 2024.
Notice of Allowance for U.S. Appl. No. 18/311,042 mailed on Sep. 27, 2024.

* cited by examiner

ELECTRICALLY-DRIVEN FRACTURING SYSTEM

CROSS REFERENCE TO RELATED APPLICATION

This application is a national phase application of International Application No. PCT/CN2022/076452, filed on Feb. 16, 2022, the contents of which are incorporated by reference in their entirety.

TECHNICAL FIELD

Embodiments of the present disclosure relate to an electrically-driven fracturing system.

BACKGROUND

With the continuous development of oil and gas exploitation technology, electrically-driven devices are more and more widely applied in the field of oil and gas exploitation, due to the advantages such as high power, energy conservation and environmental protection, light weight, small volume, etc. An electrically-driven device generally uses electric power to drive a motor, and then uses the motor to drive various functional components to achieve various functions. For example, the motor can drive a fracturing pump to pressurize a low-pressure fracturing fluid into a high-pressure fracturing fluid. For another example, the motor can drive a lubrication pump, so as to drive the lubrication fluid to lubricate the devices (such as a plunger pump) that need lubrication.

Electrically-driven devices commonly used in the field of oil and gas exploitation may include electrically-driven cementing devices, electrically-driven acidizing fracturing devices, electrically-driven fracturing devices, electrically-driven sand blending devices, instrument devices, electrically-driven hydration devices, electrically-driven liquid supply devices, and electrically-driven sand supply devices, etc. These devices are generally powered by power grid, or power generation devices.

SUMMARY

Embodiments of the present disclosure provide an electrically-driven fracturing system with multiple power supplies. The system can avoid a shutdown of the system caused by power failure or shutdown of the power generation device by providing two and more power generation devices, so as to improve the safety of power supply and reduce the damage to the equipment.

At least one embodiment of the present disclosure provides an electrically-driven fracturing system, which includes: a main power generation device; a first auxiliary power generation device; a switch device, including a low-voltage switch group and a high-voltage switch group; an electrically-driven fracturing device, including a fracturing motor and a fracturing auxiliary device; a rated generation power of the main power generation device is greater than a rated generation power of the first auxiliary power generation device, a rated output voltage of the main power generation device is greater than a rated output voltage of the first auxiliary power generation device, the high-voltage switch group includes an input end and an output end, and the low-voltage switch group includes an input end and an output end, the input end of the high-voltage switch group is connected to the main power generation device, the output end of the high-voltage switch group is connected to the fracturing motor, the input end of the low-voltage switch group is connected to the first auxiliary power generation device, and the output end of the low-voltage switch group is connected to the fracturing auxiliary device.

For example, in the electrically-driven fracturing system provided by an embodiment of the present disclosure, the main power generation device includes a generator and a power generation auxiliary device; the power generation auxiliary device is further connected to the output end of the low-voltage switch group.

For example, the electrically-driven fracturing system provided by an embodiment of the present disclosure further includes a sand blending device, an instrument device, a hydration device, a liquid supply device, and a sand supply device; at least one of the sand blending device, the instrument device, the hydration device, the liquid supply device, and the sand supply device is connected to the output end of the low-voltage switch group.

For example, in the electrically-driven fracturing system provided by an embodiment of the present disclosure, the electrically-driven fracturing device further includes a fracturing pump and a transmission mechanism, a power output shaft of the fracturing motor is connected to a power input shaft of the fracturing pump through the transmission mechanism, and configured to drive the fracturing pump to pressurize a low-pressure fluid into a high-pressure fluid.

For example, in the electrically-driven fracturing system provided by an embodiment of the present disclosure, a ratio of the rated generation power of the main power generation device to the rated generation power of the first auxiliary power generation device is greater than 10, and a ratio of the rated output voltage of the main power generation device to the rated output voltage of the first auxiliary power generation device is greater than 10.

For example, in the electrically-driven fracturing system provided by an embodiment of the present disclosure, a rated generation power of the generator is greater than 30 MW, the rated generation power of the first auxiliary power generation device is less than 1 MW, the rated output voltage of the main power generation device is greater than 10 kV, and the rated output voltage of the first auxiliary power generation device is less than 1 kV.

For example, the electrically-driven fracturing system provided by an embodiment of the present disclosure further includes: an energy storage unit, the energy storage unit includes an input end and an output end, and the output end of the energy storage unit is connected to the fracturing auxiliary device.

For example, the electrically-driven fracturing system provided by an embodiment of the present disclosure further includes a second auxiliary power generation device, the second auxiliary power generation device is connected to the input end of the energy storage unit.

For example, in the electrically-driven fracturing system provided by an embodiment of the present disclosure, the second auxiliary power generation device includes a solar power generation panel.

For example, in the electrically-driven fracturing system provided by an embodiment of the present disclosure, the input end of the energy storage unit is connected to the output end of the low-voltage switch group.

For example, in the electrically-driven fracturing system provided by an embodiment of the present disclosure, the energy storage unit includes at least one selected from a sodium-ion battery, a lithium-ion battery, a super capacitor, and a hydrogen fuel cell.

For example, in the electrically-driven fracturing system provided by an embodiment of the present disclosure, the electrically-driven fracturing device further includes a fracturing frequency converter, one end of the fracturing frequency converter is connected to the output end of the high-voltage switch group, and another end of the fracturing frequency converter is connected to the fracturing motor.

For example, in the electrically-driven fracturing system provided by an embodiment of the present disclosure, the electrically-driven fracturing device further includes: a fracturing transformer, the fracturing transformer includes an input end, a first output end and a second output end, the input end of the fracturing transformer is connected to the output end of the high-voltage switch group, the first output end of the fracturing transformer is connected to the fracturing motor, and the second output end of the fracturing transformer is connected to the fracturing auxiliary device.

For example, in the electrically-driven fracturing system provided by an embodiment of the present disclosure, the fracturing auxiliary device includes: a fan motor, configured to drive a fan in the electrically-driven fracturing device to rotate; a first heat dissipation motor, configured to drive a radiator impeller in the electrically-driven fracturing device to rotate; and a first lubrication motor, configured to drive a lubrication pump in the electrically-driven fracturing device.

For example, in the electrically-driven fracturing system provided by an embodiment of the present disclosure, the fracturing auxiliary device includes: a first frequency converter, a second frequency converter and a third frequency converter; one end of the first frequency converter is connected to the output end of the low-voltage switch group, and another end of the first frequency converter is connected to the fan motor; one end of the second frequency converter is connected to the output end of the low-voltage switch group, and another end of the second frequency converter is connected to the first heat dissipation motor; one end of the third frequency converter is connected to the output end of the low-voltage switch group, and another end of the third frequency converter is connected to the first lubrication motor.

For example, in the electrically-driven fracturing system provided by an embodiment of the present disclosure, the fracturing auxiliary device further includes: an electric conversion component, including a transformer and an inverter; and a fracturing control device, one end of the electric conversion component is connected to the output end of the low-voltage switch group, and another end of the electric conversion component is connected to the fracturing control device, the transformer is configured to convert a first voltage output by the output end of the low-voltage switch group into a second voltage, and the inverter is configured to convert an alternating current output by the output end of the low-voltage switch group into a direct current.

For example, in the electrically-driven fracturing system provided by an embodiment of the present disclosure, the power generation auxiliary device includes: a second heat dissipation motor, configured to drive a radiator impeller in the main power generation device to rotate; and a second lubrication motor, configured to drive a lubrication pump in the main power generation device.

For example, in the electrically-driven fracturing system provided by an embodiment of the present disclosure, the power generation auxiliary device further includes a barring start system, and the barring start system is connected to the output end of the low-voltage switch group.

For example, in the electrically-driven fracturing system provided by an embodiment of the present disclosure, the main power generation device is a gas turbine generator, and the first auxiliary power generation device is a piston generator.

For example, in the electrically-driven fracturing system provided by an embodiment of the present disclosure, the fracturing auxiliary device further includes an illuminating system, and the illuminating system is configured to provide a light for the electrically-driven fracturing device.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus do not limit the present disclosure.

DETAILED DESCRIPTION

Figure 1:
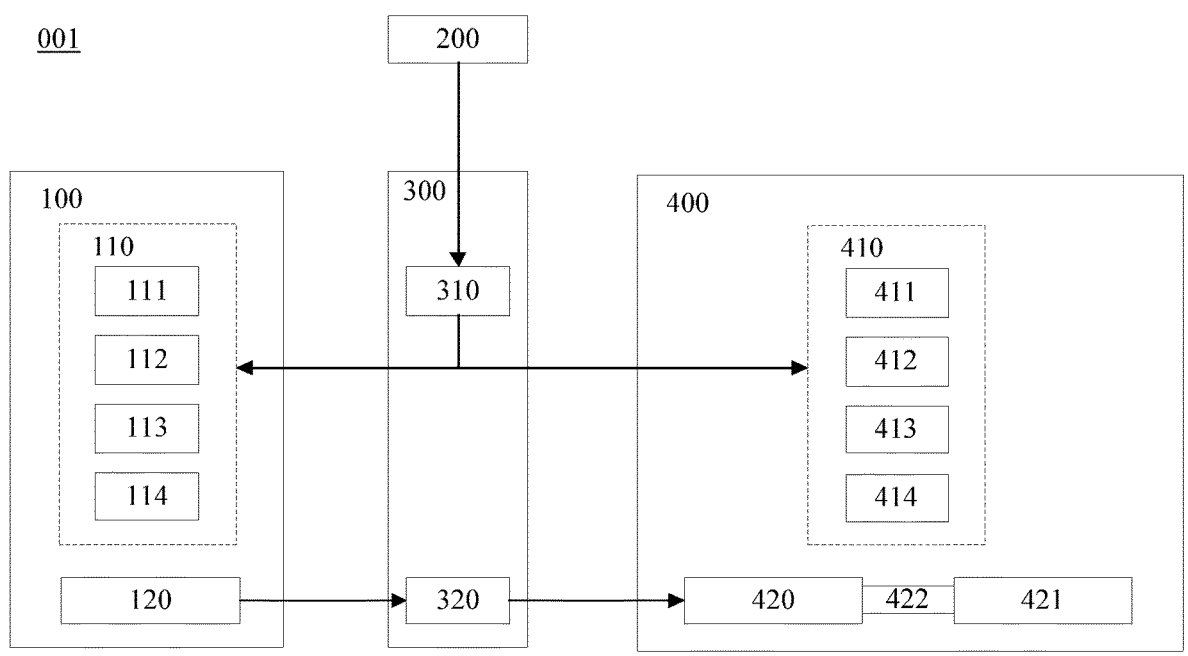
FIG. 1 is a schematic diagram of an electrically-driven fracturing system provided by an embodiment of the present disclosure.

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect.

At present, in the field of oil and gas exploitation, the electrically-driven devices are more and more widely used; however, because most oil and gas well sites are located in remote areas where power supply facilities are inadequate, power generation devices need to be equipped to supply power to electrically-driven devices.

However, under the circumstances that power generation devices are used to supply power to the electrically-driven devices of the well site, because the power generation devices need to satisfy the maximum power demand of the electrically-driven devices in the whole well site, the rated power of the power generation devices need to be configured relatively large (e.g., greater than 30 MW); on the other hand, because a lot of electrically-driven devices (such as electrically-driven fracturing device) in the well site usually operate intermittently, which results in a large fluctuation of the power demand of the well site, and the power generation devices would often be in an idle state. However, while the power generation devices are in the idle state, they still consume a lot of fuel, and the fuel efficiency is low, the fuel economy is poor. In addition, once the power generation device is powered off due to failure, all of the electrically-driven devices in the whole well site will be powered off, thereby resulting in various accidents.

For example, during the process of fracturing operation, the electrically-driven fracturing device needs a break of more than ten minutes to two hours after continuous high-power (e.g., 5000 KW-30 MW) operation for about two hours; during the break, some electrically-driven devices (e.g., control devices, necessary heat dissipation devices, and lubrication devices) still need power supply, but the power demand of the whole well site is less than 1000 KW. In this case, the high-power power generation device merely needs to provide power output of 1000 KW, and thus will be in the idle state, which results in low fuel efficiency and poor fuel economy of the power generation device. For another example, when the power generation device is powered off suddenly, the heat dissipation device and the lubrication device also stop operating, while devices (such as fracturing motor or fracturing pump) still operate due to inertia, and cannot be dissipated and lubricated through the heat dissipation device and the lubrication device, thereby resulting in the occurrence of phenomenon such as high temperature and abnormal wear, and further reducing the service life of the equipment and even causing the damage of the equipment.

On the other hand, in the electrically-driven fracturing device, in addition to the power supply needed for the fracturing motor, the fracturing auxiliary devices (such as lubrication device, heat dissipation device, and ventilation device) used for assisting the operations of the fracturing motor and fracturing pump also need power supply. In addition, while the fracturing motor and the fracturing pump are operating, other fracturing auxiliary devices also need power supply; otherwise, the electrically-driven fracturing device would not operate normally or even be damaged. For example, if the heat dissipation device does not operate while the fracturing motor and the fracturing pump are operating, the fracturing motor, the fracturing pump, and electrical components would be damaged due to high temperature.

In this regard, the embodiments of the present disclosure provide an electrically-driven fracturing system. The electrically-driven fracturing system includes a main power generation device, a first auxiliary power generation device, a switch device, and an electrically-driven fracturing device. The switch device includes a low-voltage switch group and a high-voltage switch group; the electrically-driven fracturing device includes a fracturing motor and a fracturing auxiliary device; the rated generation power of the main power generation device is greater than the rated generation power of the first auxiliary power generation device, and the rated output voltage of the main power generation device is greater than the rated output voltage of the first auxiliary power generation device; the high-voltage switch group includes an input end and an output end, the low-voltage switch group includes an input end and an output end; the input end of the high-voltage switch group is connected to the main power generation device, the output end of the high-voltage switch group is connected to the fracturing motor, the input end of the low-voltage switch group is connected to the first auxiliary power generation device, and the output end of the low-voltage switch group is connected to the fracturing auxiliary device. As such, the electrically-driven fracturing system can switch the working states of the main power generation device and the auxiliary power generation device according to the power consumption of the electrically-driven fracturing system. This prevents, on the one hand, the main power generation device from often being in the idle state, and improve the fuel efficiency and fuel economy, and on the other hand, the power failure and shutdown of the whole electrically-driven fracturing system caused by the sudden power failure of the main power generation device.

Hereinafter, the electrically-driven fracturing system provided by the embodiments of the present disclosure will be described in detail below in combination with the accompanying drawings.

An embodiment of the present disclosure provides an electrically-driven fracturing system. FIG. 1 is a schematic diagram of an electrically-driven fracturing system provided by an embodiment of the present disclosure. As shown in FIG. 1, the electrically-driven fracturing system 001 includes a main power generation device 100, a first auxiliary power generation device 200, a switch device 300, and an electrically-driven fracturing device 400. The switch device includes a low-voltage switch group 310 and a high-voltage switch group 320, and the electrically-driven fracturing device 400 includes a fracturing motor 420 and a fracturing auxiliary device 410. The rated generation power of the main power generation device 100 is greater than the rated generation power of the first auxiliary power generation device 200, the rated output voltage of the main power generation device 100 is greater than the rated output voltage of the first auxiliary power generation device 200, the high-voltage switch group 320 includes an input end and an output end, the low-voltage switch group 310 includes an input end and an output end. The input end of the high-voltage switch group 320 is connected to the main power generation device 100, the output end of the high-voltage switch group 320 is connected to the fracturing motor 420, the input end of the low-voltage switch group 310 is connected to the first auxiliary power generation device 200, and the output end of the low-voltage switch group 310 is connected to the fracturing auxiliary device 410. It should be noted that, the above-described connection between the high-voltage switch group and the fracturing motor includes the case of direct connection, and also includes the case of indirect connection through other electrical devices or electrical elements; similarly, the connection between the low-voltage switch group and the auxiliary fracturing device includes the case of direct connection, and also includes the case of indirect connection through other electrical devices or electrical elements.

In the electrically-driven fracturing system provided by the embodiments of the present disclosure, when the fracturing motor needs to operate, the main power generation device is started and power is supplied to the fracturing motor through the high-voltage switch group, when the fracturing motor does not need to operate, the main power generation device may be shut off, and power is supplied to the fracturing auxiliary device merely by the first auxiliary power generation device through the low-voltage switch group. In addition, when the main power generation device is suddenly powered off for various reasons, the first auxiliary power generation device can ensure the normal operation of the fracturing auxiliary device, and avoid the damage of equipment caused by the power failure of the fracturing auxiliary device. As such, through disposing the above-described main power generation device, auxiliary power generation device, and switch device including high-voltage switch group and low-voltage switch group, the electrically-driven fracturing system can switch the working states of the main power generation device and the auxiliary power generation device according to the power consumption of the electrically-driven fracturing system, on the one hand, the normal operation of the fracturing auxiliary device can be ensured, while the main power generation being often in the idle state is avoided, the fuel efficiency and fuel economy are improved, on the other hand, the power failure and shutdown of the whole electrically-driven fracturing system caused by the sudden power failure of the main power generation device can be avoided, thereby ensuring the safety of power supply and avoiding the reduction of service life of equipment and the damage of equipment.

On the other hand, because the switch device includes the low-voltage switch group and the high-voltage switch group, the electrically-driven fracturing system can uniformly allocate a variety of electric devices requiring different voltage levels through the switch device, which has a high flexibility and reduces the difficulty of operation. In addition, the main power generation device may adopt energy-saving and environment-friendly gas turbine power generation device, which may use low-carbon fuels (such as natural gas, hydrogen, mixture containing hydrogen, mixture of gaseous and liquid fuels) as fuels, thereby reducing carbon emission while having a higher rated generation power.

It should be noted that, the working mode of the above-described electrically-driven fracturing system is merely an example to illustrate that the electrically-driven fracturing system provided by the embodiments of the present disclosure may improve fuel efficiency and fuel economy, and ensure the safety of power supply, and avoid the reduction of service life of equipment and damage of equipment; however, the working mode of the electrically-driven fracturing system according to the embodiments of the present disclosure includes, but is not limited to this.

In some examples, a ratio of the rated generation power of the main power generation device 100 to the rated generation power of the first auxiliary power generation device 200 is greater than 10, and a ratio of the rated output voltage of the main power generation device 100 to the rated output voltage of the first auxiliary power generation device 200 is greater than 10.

In some examples, the rated generation power of the main power generation device 100 is greater than 30 MW, the rated generation power of the first auxiliary power generation device 200 is less than 1 MW, the rated output voltage of the main power generation device 100 is greater than 10 kV, and the rated output voltage of the first auxiliary power generation device 200 is less than 1 kV.

For example, the rated output voltage of the main power generation device 100 may be 13.9 kV; the rated output voltage of the first auxiliary power generation device 200 may be 480 V.

In some examples, the main power generation device 100 can adopt a gas turbine power generation device or a gas turbine generator set with a rated generation power of more than 30 MW, and the first auxiliary power generation device 200 can adopt a piston power generation device or a piston generator set with a rated generation power of less than 1 MW. Of course, the embodiments of the present disclosure include the above examples, but are not limited thereto, and other types of power generation devices can also be used for the main power generation device and the first auxiliary power generation device.

In some examples, as shown in FIG. 1, the main power generation device 100 includes a generator 120 and a power generation auxiliary device 110, the power generation auxiliary device 110 is further connected to the output end of the low-voltage switch group 310. Due to the large rated generation power the main power generation device, the main power generation device further needs to be equipped with power generation auxiliary devices that provide auxiliary functions (such as provide lubrication, heat dissipation, etc.) for the generator, in addition to the generator. In this case, through connecting the power generation auxiliary device to the output end of the low-voltage switch group, the electrically-driven fracturing system can ensure the normal operation of the power generation auxiliary device through the first auxiliary power generation device, while the main power generation device is shut off, such that, on the one hand, the damage of equipment caused by the power failure of the power generation auxiliary device can be avoided, and on the other hand, the rapid start of the main power generation device can be realized.

In some examples, as shown in FIG. 1, the generator 120 supplies power to the fracturing motor 420 through the high-voltage switch group 320, and the first auxiliary power generation device 200 supplies power to the fracturing auxiliary device 410 and the power generation auxiliary device 110 through the low-voltage switch group 310, respectively. In this case, even if the generator 120 is abnormally shut down, the fracturing auxiliary device 410 and the power generation auxiliary device 110 can still work normally, so as to ensure that the electrically-driven fracturing device and the main power generation device can obtain corresponding lubrication and heat dissipation, thereby avoiding abnormal wear and damage of the electrically-driven fracturing device and the main power generation device, and further ensure the normal operation of the control devices in the electrically-driven fracturing device and the main power generation device, thereby preventing the electrically-driven fracturing device and the main power generation device from being out of control.

In some examples, as shown in FIG. 1, the electrically-driven fracturing device 400 further includes a fracturing pump 421 and a transmission mechanism 422. The power output shaft of the fracturing motor 420 is connected to the power input shaft of the fracturing pump 421 through the transmission mechanism 422, and is configured to drive the fracturing pump 421 to pressurize the low-pressure fluid into high-pressure fluid.

In some examples, as shown in FIG. 1, the fracturing auxiliary device 410 includes a first fan motor 411, a first heat dissipation motor 412 and a first lubrication motor 413; the first fan motor 411 is configured to drive the rotation of the fan in the electrically-driven fracturing device 400, so as to provide ventilation air for the electrically-driven fracturing device 400; the first heat dissipation motor 412 is configured to drive the rotation of the radiator impeller in the electrically-driven fracturing device 400, so as to realize the function of heat dissipation; the first lubrication motor 413 is configured to drive the lubrication pump in the electrically-driven fracturing device 400, so as to realize the function of lubrication. As such, the fracturing auxiliary device can realize various functions such as ventilation, heat dissipation, lubrication, and so on.

In some examples, as shown in FIG. 1, the power generation auxiliary device 110 includes a second heat dissipation motor 111 and a second lubrication motor 113; the second heat dissipation motor 111 is configured to drive the rotation of the radiator impeller in the main power generation device 100; the second lubrication motor 113 is configured to drive the lubrication pump in the main power generation device 100. As such, the power generation auxiliary device can realize various functions, such as heat dissipation, lubrication and so on.

In some examples, as shown in FIG. 1, the power generation auxiliary device 110 further includes a power generation control device 114. As such, the power generation control device can realize the functions, such as detection, feedback, and control of the main power generation device.

In some examples, as shown in FIG. 1, the power generation auxiliary device 110 further includes a barring start system 112, and the barring start system 112 is configured such that the main power generation device 100 is uniformly heated while starting and the main power generation device 100 is uniformly cooled while shutting down.

Figure 2:
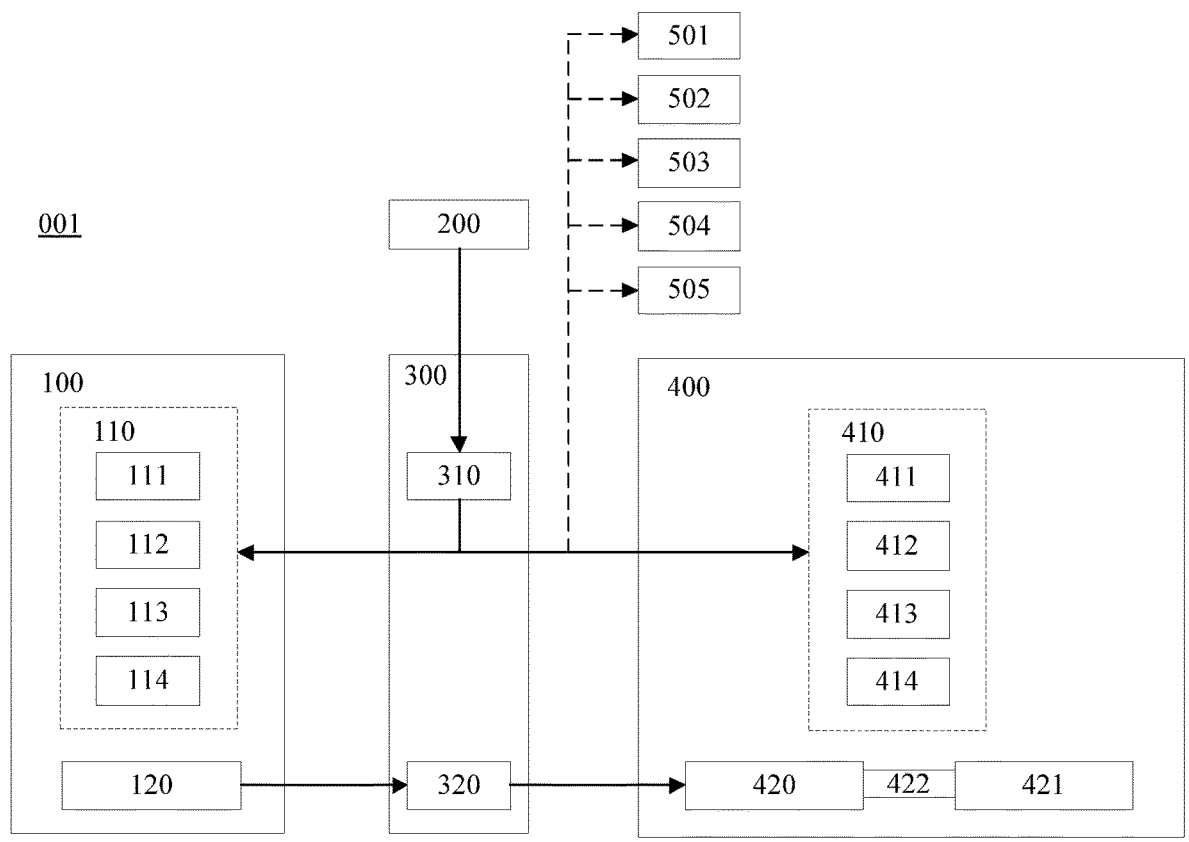
FIG. 2 is a schematic diagram of another electrically-driven fracturing system provided by an embodiment of the present disclosure.

FIG. 2 is a schematic diagram of another electrically-driven fracturing system provided by an embodiment of the present disclosure. As shown in FIG. 2, the electrically-driven fracturing system 001 may further include a sand blending device 501, an instrument device 502, a hydration device 503, a liquid supply device 504, and a sand supply device 505; at least one of the sand blending device 501, the instrument device 502, the hydration device 503, the liquid supply device 504, and the sand supply device 505 is connected to the output end of the low-voltage switch group 310. As such, the electrically-driven fracturing system can realize various types of auxiliary functions, such as the function of sand supply, the function of sand blending, and so on.

Figure 3:
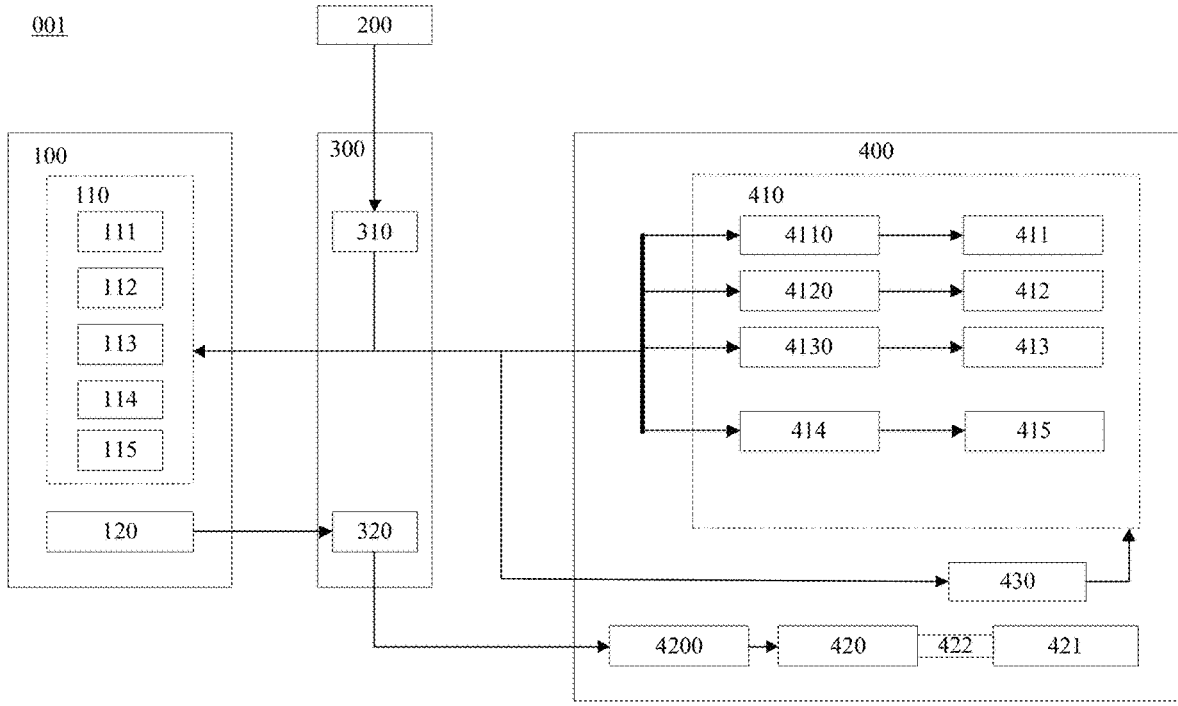
FIG. 3 is a schematic diagram of another electrically-driven fracturing system provided by an embodiment of the present disclosure.

FIG. 3 is a schematic diagram of another electrically-driven fracturing system provided by an embodiment of the present disclosure. As shown in FIG. 3, the power generation auxiliary device 110 may further include: a second fan motor 115, which is configured to drive the rotation of the fan in the main power generation device 100. As such, the power generation auxiliary device can realize the function of ventilation.

In some examples, as shown in FIG. 3, the electrically-driven fracturing system 001 further includes an energy storage unit 430. The energy storage unit 430 includes an input end and an output end, the output end of the energy storage unit 430 is connected to the fracturing auxiliary device 410, and used for supplying power to the fracturing auxiliary device 410. As such, when the main power generation device is powered off and the first auxiliary power generation device is also powered off, the energy storage unit can provide emergency power supply, so as to further improve the safety of power supply of the whole electrically-driven fracturing system.

In some examples, the energy storage unit 430 includes at least one of sodium-ion battery, lithium-ion battery, super capacitor, and hydrogen fuel cell. As such, the above-described energy storage unit has fast charge and discharge capability and relatively large energy density. Of course, the embodiments of the present disclosure include but are not limited to this, and the above-described energy storage unit may also adopt other energy storage methods.

In some examples, as shown in FIG. 3, the input end of the energy storage unit 430 is connected to the output end of the low-voltage switch group 310, as such, the electrically-driven fracturing equipment can charge the energy storage unit through the first auxiliary power generation device.

In some examples, as shown in FIG. 3, in some examples, the electrically-driven fracturing device further includes a fracturing frequency converter 4200, one end of the fracturing frequency converter 4200 is connected to the output end of the high-voltage switch group 320, and another end of the fracturing frequency converter 4200 is connected to the fracturing motor 420. As such, through the above-described fracturing frequency converter, the fracturing motor can realize stepless speed regulation, continuous change of speed and enhancement of transmission efficiency.

In some examples, as shown in FIG. 3, the fracturing auxiliary device 410 includes a first fan motor 411, a first heat dissipation motor 412, and a first lubrication motor 413; the first fan motor 411 is configured to drive the rotation of the fan in the electrically-driven fracturing device 400, so as to provide ventilation air for the electrically-driven fracturing device 400; the first heat dissipation motor 412 is configured to drive the rotation of the radiator impeller in the electrically-driven fracturing device 400, so as to realize the function of heat dissipation; the first lubrication motor 413 is configured to drive the lubrication pump in the electrically-driven fracturing device 400, so as to realize the function of lubrication. As such, the fracturing auxiliary device can realize various functions such as ventilation, heat dissipation, lubrication and so on.

In some examples, as shown in FIG. 3, the fracturing auxiliary device 410 further includes: a first frequency converter 4110, a second frequency converter 4120, and a third frequency converter 4130. One end of the first frequency converter 4110 is connected to the output end of the low-voltage switch group 310, and another end of the first frequency converter 4110 is connected to the first fan motor 411. One end of the second frequency converter 4120 is connected to the output end of the low-voltage switch group 310, and another end of the second frequency converter 4120 is connected to the first heat dissipation motor 412. One end of the third frequency converter 4130 is connected to the output end of the low-voltage switch group 310, and another end of the third frequency converter 4130 is connected to the first lubrication motor 413. As such, the fracturing auxiliary device can realize stepless speed regulation, continuous change of speed and enhancement of transmission efficiency.

Figure 4:
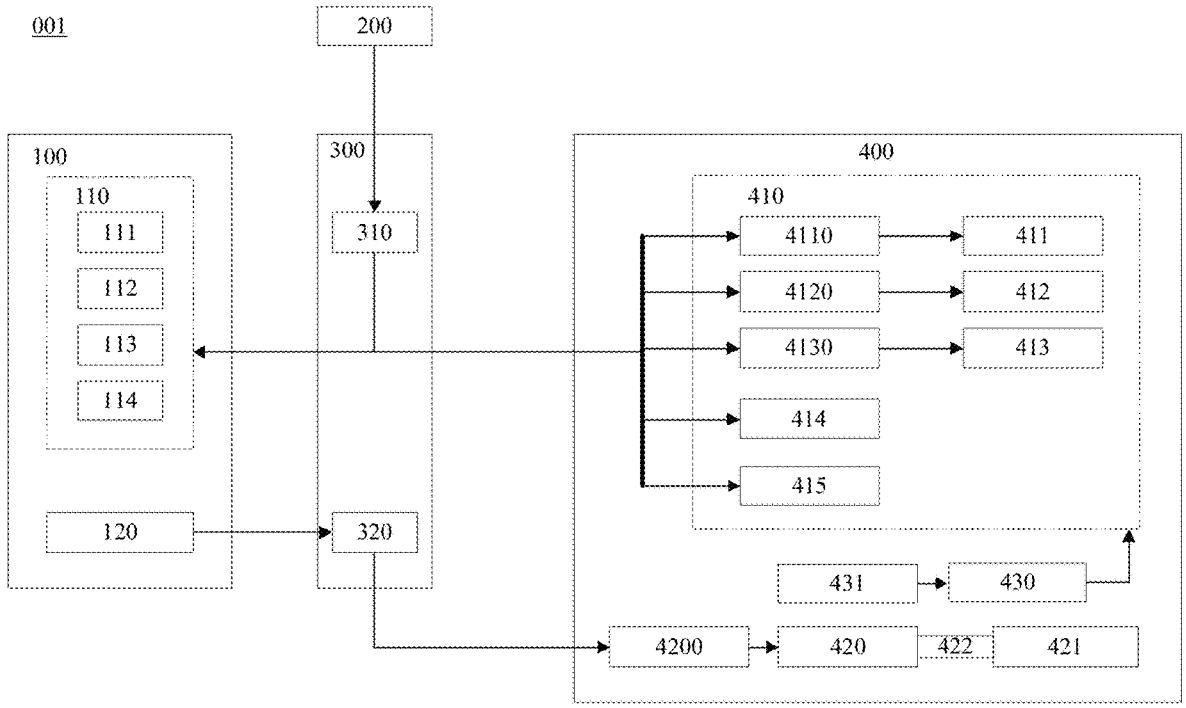
FIG. 4 is a schematic diagram of another electrically-driven fracturing system provided by an embodiment of the present disclosure.

FIG. 4 is a schematic diagram of another electrically-driven fracturing system provided by an embodiment of the present disclosure. As shown in FIG. 4, the electrically-driven fracturing system 001 further includes a second auxiliary power generation device 431. The second auxiliary power generation device 431 is connected to the input end of the energy storage unit 430. As such, the energy storage unit can be charged through the second auxiliary power generation device. As such, the electrically-driven fracturing system shown in FIG. 4 provides another method for charging the energy storage unit.

In some examples, the second auxiliary power generation device 431 includes a solar power generation panel. Of course, the embodiments of the present disclosure include but are not limited to this, and the second auxiliary power generation device can also be other types of power generation devices.

It is noted that, unlike the traditional electrically-driven fracturing system which can update and check the equipment status, update the control program, etc., only through external power generation or power grid, when the electrically-driven fracturing system includes the energy storage unit and the solar power generation panel, the electrically-driven fracturing system may have portions or all of control devices online in real time, wake up the control devices through wireless or wired mode, thereby obtaining more functions of the control devices (such as updating the control program, reading the stored data of the control device, obtaining the image of surrounding environment, obtaining the real-time location of the equipment, etc.), so as to make the maintenance and inspection of the equipment more convenient and no longer rely solely on external power supply.

In some examples, as shown in FIG. 4, the fracturing auxiliary device 410 further includes: an illuminating system 414, and the illuminating system 414 is configured to provide light for the electrically-driven fracturing system.

In some examples, as shown in FIG. 4, the fracturing auxiliary device 410 further includes: a fracturing control device 415. As such, the fracturing control device can realize the functions of detection, feedback, and control of the electrically-driven fracturing device.

Figure 5:
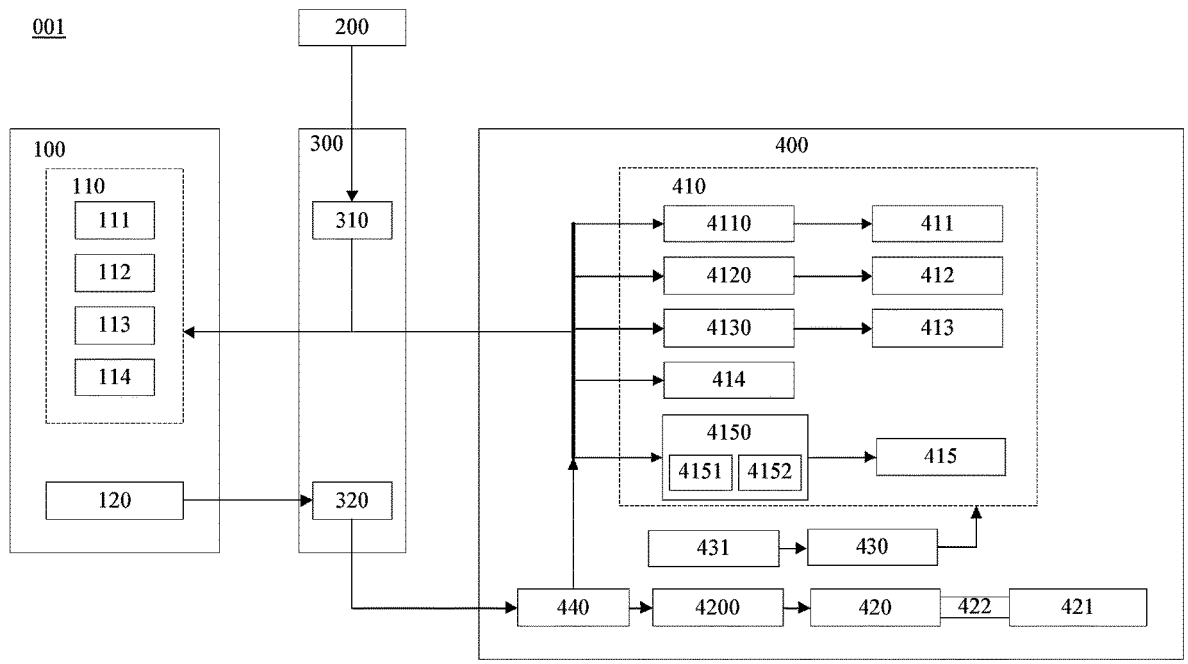
FIG. 5 is a schematic diagram of an electrically-driven fracturing system including a transformer provided by an embodiment of the present disclosure.

FIG. 5 is another electrically-driven fracturing system provided by an embodiment of the present disclosure. As shown in FIG. 5, the electrically-driven fracturing system 001 further includes a fracturing transformer 440; the fracturing transformer 440 includes an input end, a first output end and a second output end; the input end of the fracturing transformer 440 is connected to the output end of the high-voltage switch group 320; the first output end of the fracturing transformer 440 is connected to the fracturing auxiliary device 410; the second output end of the fracturing transformer 440 is connected to the fracturing frequency converter 4200. As such, the electrically-driven fracturing system can flexibly increase the voltage through disposing the above-described fracturing transformer, so as to satisfy various voltage conditions required for the operations of different devices that need power supply, and can also reduce the voltage to supply power to the fracturing auxiliary devices. As such, when the first auxiliary power generation device breaks down, the safety of power supply of the fracturing auxiliary device can be maintained through the main power generation device and the fracturing transformer.

In some examples, as shown in FIG. 5, the fracturing auxiliary device 410 further includes: an electric conversion component 4150 and a fracturing control device 415; the electric conversion component includes a transformer 4151 and an inverter 4152; one end of the electric conversion component 4150 is connected to the output end of the low-voltage switch group 310, and another end of the electric conversion component 4150 is connected to the fracturing control device 415; the transformer 4151 is configured to convert a first voltage output by the output end of the low-voltage switch group 310 into a second voltage, and the inverter 4152 is configured to convert an alternating current output by the output end of the low-voltage switch group 310 into a direct current. As such, the electric conversion component 4150 can convert the alternating current output by the fracturing transformer 440 into direct current, thereby driving the control device 415 that need to be driven by direct current.

In some examples, the second voltage is less than the first voltage, the second voltage is 24 V, and the first voltage is 480 V.

For example, the fracturing control device 415 includes modules, such as input, output, logic control, communication, storage, sensing and detection; communication with the remote control system can also be achieved through the fracturing control device 415. As such, the remote control system can obtain the operating parameters of the above-described devices through the fracturing control device, and remotely operate and control the corresponding devices according to these operating parameters. Of course, the embodiments of the present disclosure include but are not limited to this.

In some examples, the above-described communication connection includes communication connection through wired connection (e.g., wire, optical fiber, etc.) and communication connection through wireless connection (e.g., WiFi, mobile network).

In some examples, the above-described fracturing control device and power generation control device may include a storage medium and a processor; the storage medium is used for storing computer programs; the processor is used for executing computer programs in the storage medium to realize various control operations.

For example, the above-described storage medium may be volatile memory and/or non-volatile memory. The volatile memory may include, for example, random access memory (RAM) and/or cache memory (cache), and so on. The non-volatile memory may include, for example, read only memory (ROM), hard disk, flash memory, and so on.

For example, the above-described processor may be a central processing unit (CPU) or other forms of processing devices with data processing capability and/or instruction executing capability, such as microprocessor, programmable logic controller (PLC), etc.

Figure 6:
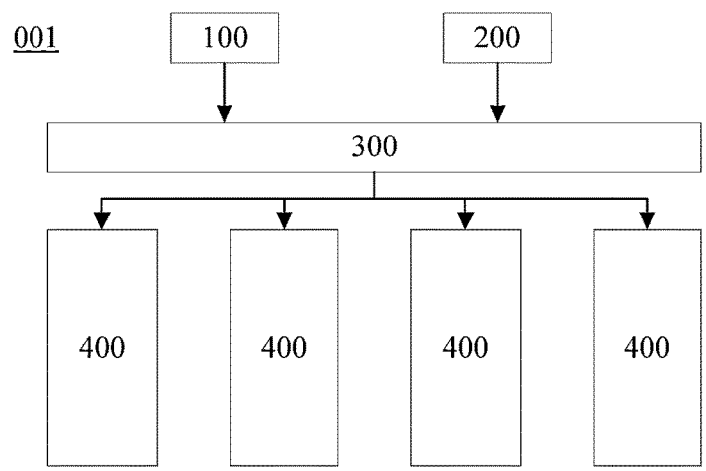
FIG. 6 is a schematic diagram of another electrically-driven fracturing system provided by an embodiment of the present disclosure.

FIG. 6 is a schematic diagram of another electrically-driven fracturing system provided by an embodiment of the present disclosure. The electrically-driven fracturing system 001 may be provided with a plurality of electrically-driven fracturing devices 400, and high-voltage power and low-voltage power are respectively transmitted for each electrically-driven fracturing device 400 through the switch device 300. As such, the electrically-driven fracturing system can achieve large displacement.

The following aspects should be noted:

(1) The drawings of the embodiments of the present disclosure are merely related to the structures that are related to the embodiments of the present disclosure, while other structures can refer to the common design.

(2) The features in the same embodiment and different embodiments of the present disclosure can be combined with each other without contradiction.

The above merely illustrates the specific embodiments of the disclosure, but the claimed scope of the disclosure is not limited thereto. Any variations or substitutions that may be readily achieved by person skilled in the art based on the scope of the disclosure should be included within the scope of the present disclosure. Therefore, the scope of the present disclosure should be subject to the scope of the claims.

What is claimed is:

1. An electrically-driven fracturing system, comprising:
a main power generation device;
a first auxiliary power generation device;

a switch device, comprising a low-voltage switch group and a high-voltage switch group;
an electrically-driven fracturing device, comprising a fracturing motor and a fracturing auxiliary device;
wherein, a rated generation power of the main power generation device is greater than a rated generation power of the first auxiliary power generation device, a rated output voltage of the main power generation device is greater than a rated output voltage of the first auxiliary power generation device, the high-voltage switch group comprises an input end and an output end, and the low-voltage switch group comprises an input end and an output end,
the input end of the high-voltage switch group is connected to the main power generation device, the output end of the high-voltage switch group is connected to the fracturing motor, the input end of the low-voltage switch group is connected to the first auxiliary power generation device, and the output end of the low-voltage switch group is connected to the fracturing auxiliary device.

2. The electrically-driven fracturing system according to claim 1, wherein, the main power generation device comprises a generator and a power generation auxiliary device; the power generation auxiliary device is further connected to the output end of the low-voltage switch group.

3. The electrically-driven fracturing system according to claim 1, further comprising:
a sand blending device, an instrument device, a hydration device, a liquid supply device, and a sand supply device;
wherein, at least one of the sand blending device, the instrument device, the hydration device, the liquid supply device, and the sand supply device is connected to the output end of the low-voltage switch group.

4. The electrically-driven fracturing system according to claim 1, wherein, the electrically-driven fracturing device further comprises a fracturing pump and a transmission mechanism, a power output shaft of the fracturing motor is connected to a power input shaft of the fracturing pump through the transmission mechanism, and configured to drive the fracturing pump to pressurize a low-pressure fluid into a high-pressure fluid.

5. The electrically-driven fracturing system according to claim 1, wherein, a ratio of the rated generation power of the main power generation device to the rated generation power of the first auxiliary power generation device is greater than 10, and a ratio of the rated output voltage of the main power generation device to the rated output voltage of the first auxiliary power generation device is greater than 10.

6. The electrically-driven fracturing system according to claim 1, wherein, a rated generation power of the main power generation device is greater than 30 MW, the rated generation power of the first auxiliary power generation device is less than 1 MW, the rated output voltage of the main power generation device is greater than 10 kV, and the rated output voltage of the first auxiliary power generation device is less than 1 kV.

7. The electrically-driven fracturing system according to claim 1, further comprising:
an energy storage unit,
wherein, the energy storage unit comprises an input end and an output end, and the output end of the energy storage unit is connected to the fracturing auxiliary device.

8. The electrically-driven fracturing system according to claim 7, further comprising:

a second auxiliary power generation device,
wherein, the second auxiliary power generation device is connected to the input end of the energy storage unit.

9. The electrically-driven fracturing system according to claim 8, wherein, the second auxiliary power generation device comprises a solar power generation panel.

10. The electrically-driven fracturing system according to claim 7, wherein, the input end of the energy storage unit is connected to the output end of the low-voltage switch group.

11. The electrically-driven fracturing system according to claim 7, wherein, the energy storage unit comprises at least one selected from a sodium-ion battery, a lithium-ion battery, a super capacitor, and a hydrogen fuel cell.

12. The electrically-driven fracturing system according to claim 1, wherein, the electrically-driven fracturing device further comprises a fracturing frequency converter, one end of the fracturing frequency converter is connected to the output end of the high-voltage switch group, and another end of the fracturing frequency converter is connected to the fracturing motor.

13. The electrically-driven fracturing system according to claim 12, wherein, the electrically-driven fracturing device further comprises:
a fracturing transformer,
wherein, the fracturing transformer comprises an input end, a first output end, and a second output end, the input end of the fracturing transformer is connected to the output end of the high-voltage switch group, the first output end of the fracturing transformer is connected to the fracturing motor, and the second output end of the fracturing transformer is connected to the fracturing auxiliary device.

14. The electrically-driven fracturing system according to claim 1, wherein, the fracturing auxiliary device comprises:
a fan motor, configured to drive a fan in the electrically-driven fracturing device to rotate;
a first heat dissipation motor, configured to drive a radiator impeller in the electrically-driven fracturing device to rotate; and
a first lubrication motor, configured to drive a lubrication pump in the electrically-driven fracturing device.

15. The electrically-driven fracturing system according to claim 14, wherein, the fracturing auxiliary device comprises:
a first frequency converter, a second frequency converter and a third frequency converter;
one end of the first frequency converter is connected to the output end of the low-voltage switch group, and another end of the first frequency converter is connected to the fan motor,
one end of the second frequency converter is connected to the output end of the low-voltage switch group, and another end of the second frequency converter is connected to the first heat dissipation motor;
one end of the third frequency converter is connected to the output end of the low-voltage switch group, and another end of the third frequency converter is connected to the first lubrication motor.

16. The electrically-driven fracturing system according to claim 1, wherein, the fracturing auxiliary device further comprises:
an electric conversion component, comprising a transformer and an inverter; and
a fracturing control device,
wherein, one end of the electric conversion component is connected to the output end of the low-voltage switch group, and another end of the electric conversion component is connected to the fracturing control device, the transformer is configured to convert a first voltage output by the output end of the low-voltage switch group into a second voltage, and the inverter is configured to convert an alternating current output by the output end of the low-voltage switch group into a direct current.

17. The electrically-driven fracturing system according to claim 2, wherein, the power generation auxiliary device comprises:

a second heat dissipation motor, configured to drive a radiator impeller in the main power generation device to rotate; and a second lubrication motor, configured to drive a lubrication pump in the main power generation device.

18. The electrically-driven fracturing system according to claim 17, wherein, the power generation auxiliary device further comprises a barring start system, and the barring start system is connected to the output end of the low-voltage switch group.

19. The electrically-driven fracturing system according to claim 1, wherein, the main power generation device is a gas turbine generator, and the first auxiliary power generation device is a piston generator.

20. The electrically-driven fracturing system according to claim 1, wherein, the fracturing auxiliary device further comprises an illuminating system, and the illuminating system is configured to provide a light for the electrically-driven fracturing device.

* * * * *